United States Patent [19]

Sato

[11] Patent Number: 5,034,976
[45] Date of Patent: Jul. 23, 1991

[54] SYSTEM FOR REGISTERING DATA INTO A MEMORY

[75] Inventor: Kenichiro Sato, Yokohama, Japan

[73] Assignee: Canon Kabushiki Kaisha, Tokyo, Japan

[21] Appl. No.: 485,475

[22] Filed: Feb. 27, 1990

[30] Foreign Application Priority Data

Mar. 2, 1989 [JP] Japan ................ 03021989 .......................... 1-48638

[51] Int. Cl.⁵ ............................................. H04M 1/26
[52] U.S. Cl. ..................................... 379/113; 379/140; 379/355
[58] Field of Search ............... 379/111, 113, 140, 355, 379/356

[56] References Cited

U.S. PATENT DOCUMENTS 4,833,705  5/1989  Kobayashi ...................... 379/355 X Primary Examiner—Stafford D. Schreyer
Attorney, Agent, or Firm—Fitzpatrick, Cella, Harper & Scinto

[57] ABSTRACT

A system for registering data into a memory has memory means for storing a plurality of data in a predetermined form and retrieves the stored data for use in a desired process. The memory means is divided into a first area in which the data in the predetermined form is stored, and a second area. The data used in the desired process as well as frequency of use data are stored in the second area. The data stored in the second area is reused for the desired process, and the frequency of use data of that data is updated. When the frequency of use data reaches a predetermined state, the data is moved into the first area as formal registration data.

11 Claims, 8 Drawing Sheets

SYSTEM FOR REGISTERING DATA INTO A MEMORY

BACKGROUND OF THE INVENTION

1. Field of the Invention

The present invention relates to a system for registering data into a memory, and more particularly to a system for registering data into a memory, which comprises memory means for storing a plurality of data in a predetermined form and which retrieves data stored in the memory means for use in a desired process.

2. Related Background Art

In a communication apparatus such as a facsimile machine, an image communication system has been known in which a memory for storing telephone numbers of destination stations is provided and a desired destination station is called by a selection number registered in the memory by dialing a specific abbreviated number or manipulating a one-touch key.

In the past, when the telephone numbers are to be stored in the memory, they are sequentially registered in a memory area of a fixed address having a constant amount of capacity. The telephone numbers must be registered one by one in accordance with a predetermined procedure prior to the utilization of the system, and no method has been known to fluidically register the telephone numbers during the utilization of the system.

However, the prior art system includes the following shortcomings from the standpoint of the effective utilization of the memory area.

(1) Where the number of addressees of the registered telephone numbers is small, there is a large vacant area in the memory area and the utilization efficiency of the memory is low.

(2) Where a user has dialed an unregistered telephone number and the user wants to redial it, the user must remember the telephone number. In this case, if an equipment has a redialing function, it may be done by a one-touch manipulation, but if that number is to be registered for further subsequent use, registration is required.

Such problems are not limited to communication apparatus but are common to apparatus in which data to be used in actual processing is registered in a memory and it is retrieved from the memory as required.

Prior patents and applications relating to one-touch dialing are U.S. Pat. No. 4,833,705, U.S. Pat. No. 4,825,461 U.S. Ser. No. 080,093 filed on July 31, 1987 and U.S. Ser. No. 192,652 filed on May 11, 1988, all assigned to the assignee of the present application.

SUMMARY OF THE INVENTION

It is an object of the present invention to improve the system for registering data into a memory, in connection with the above problems.

It is another object of the present invention to provide a system for registering data into a memory, which allows the registration of data into the memory during the use of the system with a simple operation and also allows the readout of data with ease.

It is another object of the present invention to register data into a memory in accordance with frequency of usage of data.

It is another object of the present invention to provide a system for registering data into a memory, which automatically registers the data into the memory in accordance with frequency of usage of the data without requiring any specific registration operation.

Other objects of the present invention will be apparent from the description of the embodiments and the accompanying drawings.

DETAILED DESCRIPTION OF THE PREFERRED EMBODIMENTS

Figure 1:
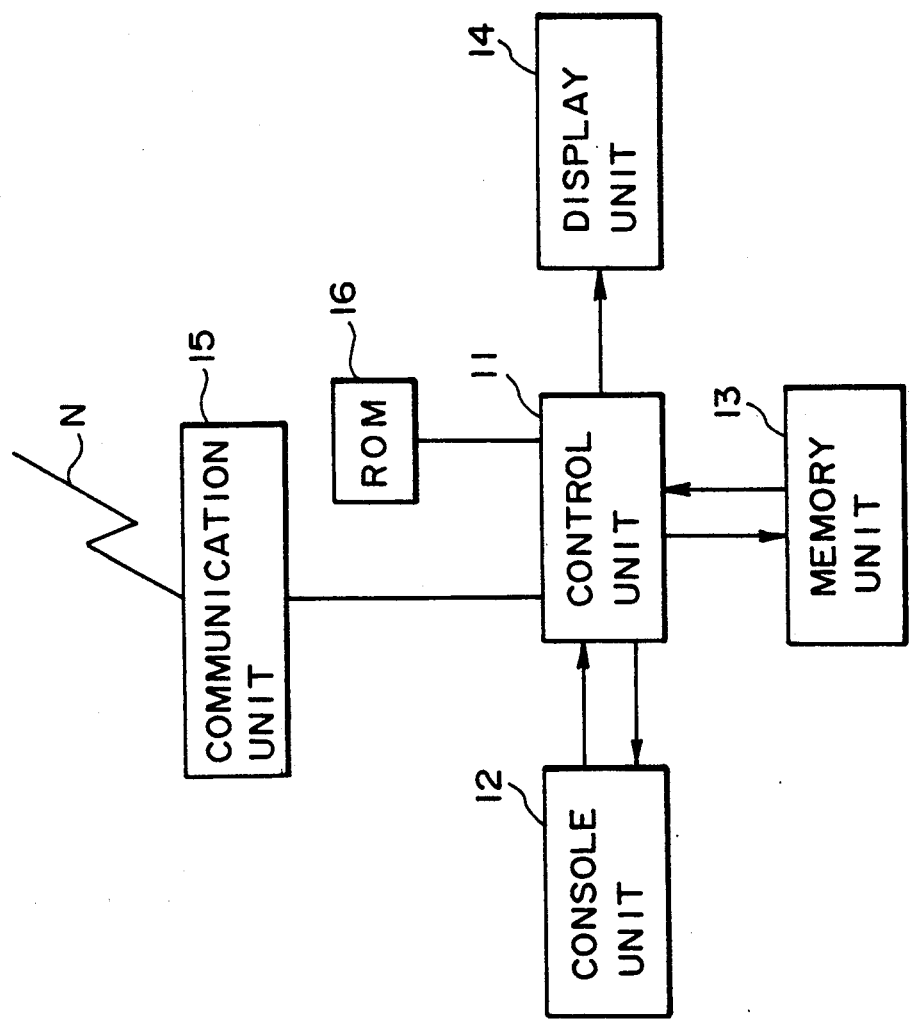
FIG. 1 shows a block diagram of a system for registering data into a memory in accordance with the present invention.

The present invention is now explained in detail with reference to embodiments shown in the drawings.

FIG. 1 shows a configuration of a communication apparatus in accordance with the present invention. It shows basic elements which are common to facsimile machines or various other data communication apparatus.

In FIG. 1, numeral 11 denotes a control unit which comprises a microprocessor or the like. It controls the entire system in accordance with a program stored in a ROM 16, as described later.

Numeral 12 denotes a console unit which comprises a key board which includes a ten-key and function keys.

Numeral 14 denotes a display unit which comprises an LCD display or the like. It is used to display a current time and an operation status, and for the edition is registering a telephone number, as will be described later.

Numeral 15 denotes a communication unit. In a case of a facsimile machine, it comprises an NCU, a modem, a coder/decoder and an image input/output unit.

In the present embodiment, in order to store telephone numbers of destination stations to be called, a memory unit 13 which may be a RAM is provided. The memory unit 13 is also used as a buffer for data to be sent and received.

Figure 2:
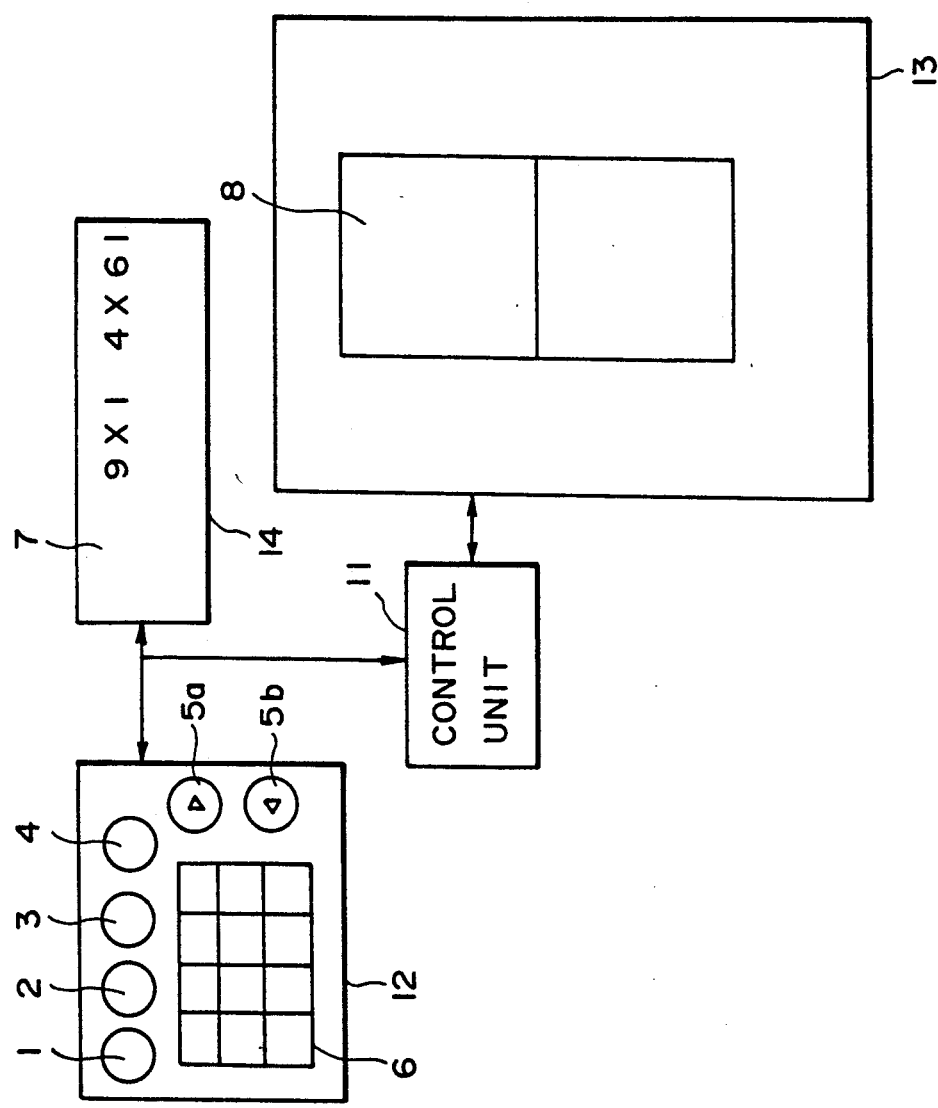
FIG. 2 shows a block diagram of further detail of the configuration of FIG. 1, FIGS. 3 and 4 show flow charts of a control sequence of a control unit of FIG. 1, and FIGS. 5 to 9 illustrate an operation sequence of the system of FIG. 1 and a memory control.

FIG. 2 shows a detail of the control unit 11, the console unit 12, the memory unit 13 and the display unit 14 of FIG. 1.

The console unit 12 of FIG. 2 is provided with console keys 1–6.

Numeral 1 denotes an on-hook key which connects the communication unit 15 with a line N to establish a ready-to-call state, as if a handset of a telephone set is hooked off. Numeral 2 denotes a start key which instructs the start of communication, and numeral 3 denotes a stop/clear key which instructs the stop of process or the clear of the inputted data.

Numeral 4 denotes a telephone directory key for selecting a telephone directory mode to be described later, in which mode the memory unit 13 functions as a memory area. In the telephone directory mode, a desired telephone number may be retrieved by retrieval keys 5a and 5b.

The telephone number is entered by a ten-key 6 in a manual dialing mode or a memory registration mode.

On the other hand, the display unit 14 has a display screen 7 which comprises an LCD panel or the like for displaying a current time and a telephone number.

The memory unit 13 has two memory areas 8 and 9, which are used for storing the telephone numbers in the telephone directory mode. The registration area 8 is the area in which the telephone numbers have already been registered, and the vacant area 9 is an unused area.

The operation of the above configuration is now explained in detail with reference to flow charts of FIGS. 3 and 4. A process shown in FIGS. 3 and 4 is stored in the ROM 16 as a control program of the control unit 11.

Figures 3, 4:
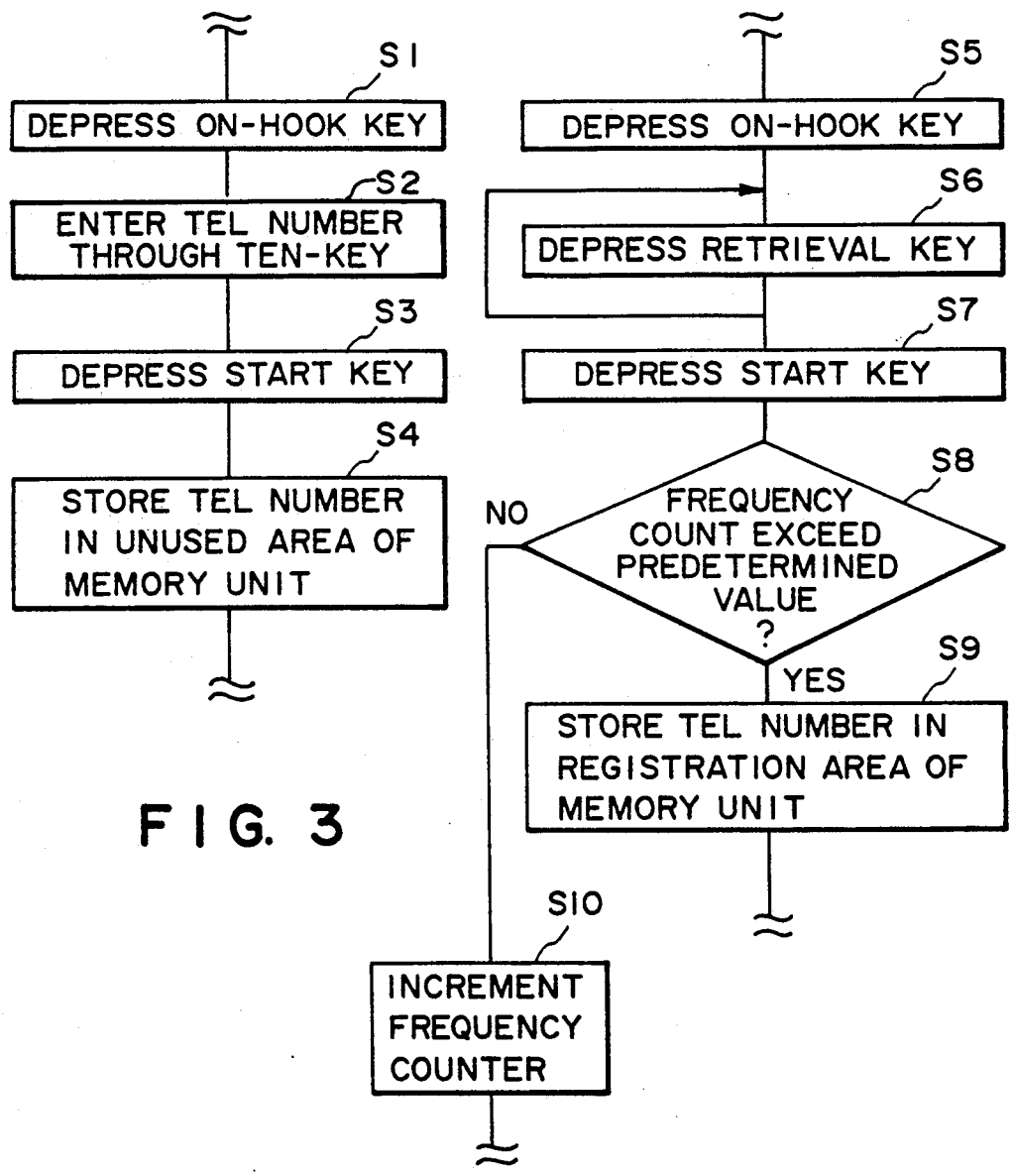

When the on-hook key 1 is depressed in a step S1 of FIG. 3, a number is entered by the ten-key 6 is in a step S2. When the start key 2 is depressed in a step S3, a call is made by the communication unit 15.

The telephone number entered by the ten-key 6 is stored in the vacant area 9 in a step S4. This process is shown in FIG. 5.

Figure 5:
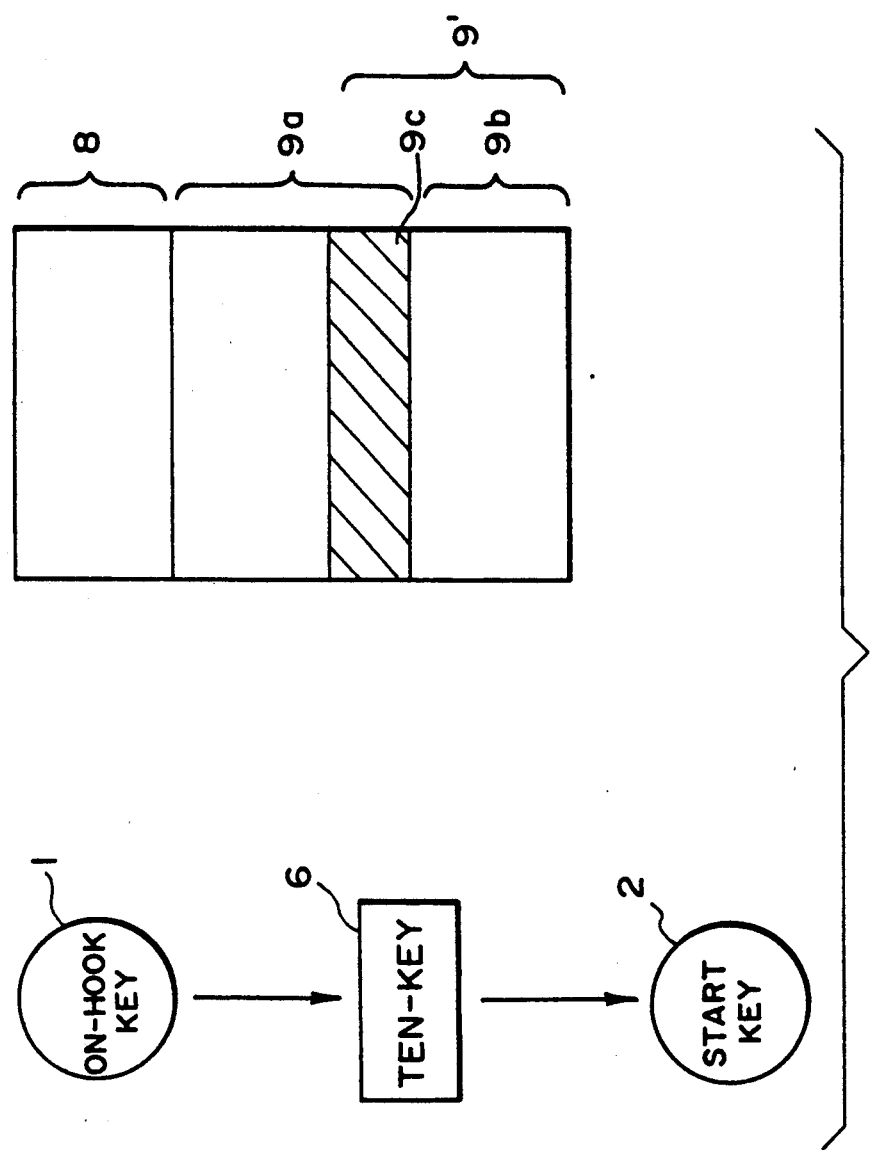

As shown in FIG. 5, as the manual entry of the telephone number by the on-hook key 1 and the ten-key 6 and the depression of the start key 2 are sequentially done, a new area 9c is formed at a rear portion of an area 9a, and the telephone number data entered by the ten-key 6 is stored therein. The data is stored at that area without being erased after the communication, as opposed to the prior art system. Accordingly, the manually entered telephone numbers are sequentially stored in the area 9a. Thereafter, the vacant area becomes an area 9b. Numeral 9' denotes a vacant area which exists before the execution of the process.

Assuming that the steps S1-S4 of FIG. 3 has been executed once, the telephone number used therein may be readily reused during the usage of the system by a procedure shown in FIG. 4.

In a step S5 of FIG. 4, the on-hook key 1 is depressed, and the retrieval keys 5a and 5b are depressed in a step S6. Thus, the telephone number previously dialed is displayed on the LCD 7. The retrieval by the retrieval keys 5a and 5b is done for the area 9a (hatched area in FIG. 6) in which the telephone numbers used in the manual dialing mode have been registered. Each time the retrieval key 5 is depressed, the stored telephone number is read out in the sequence starting from the top of the area 9a, and it is displayed on the display unit 14. Of course, the displayed data may be moved forward or backward in accordance with the direction of arrow of the retrieval keys 5a and 5b.

When the desired destination station is displayed on the display unit 14, the user depresses the start key 2 in a step S7. Thus, the call is made again to the displayed number.

Thereafter (after or before the communication), whether the count of the frequency of use of the telephone number in the area 9a which was used for making the call has exceeded a predetermined number or not is determined in a step S8. If the decision in the step S8 is affirmative, the process proceeds to a step S9, and if the decision is negative, the process proceeds to a step S10.

In the step S9, the telephone number in the area 9a which was used immediately before is stored at a rear portion of the registration area 8. Thus, the telephone number is stored in the registration area 8 as formal registration data. As a result, the registration area 8 becomes larger and the vacant area 9 becomes smaller.

In the step S10, the counter associated with the telephone number used immediately before (or that memory portion in the area 9a) which has been set in the predetermined area of the memory unit 13 is incremented by one.

In this manner, it is possible, without any specific registration process, to store the telephone number used in the manual dialing mode into the vacant area of the memory and reuse it by retrieving it during the use of the system.

If the telephone number is used more than the predetermined times, that number is registered into the registration area as the formal registration data so that it can be retrieved for use in the telephone directory mode.

Figure 7:
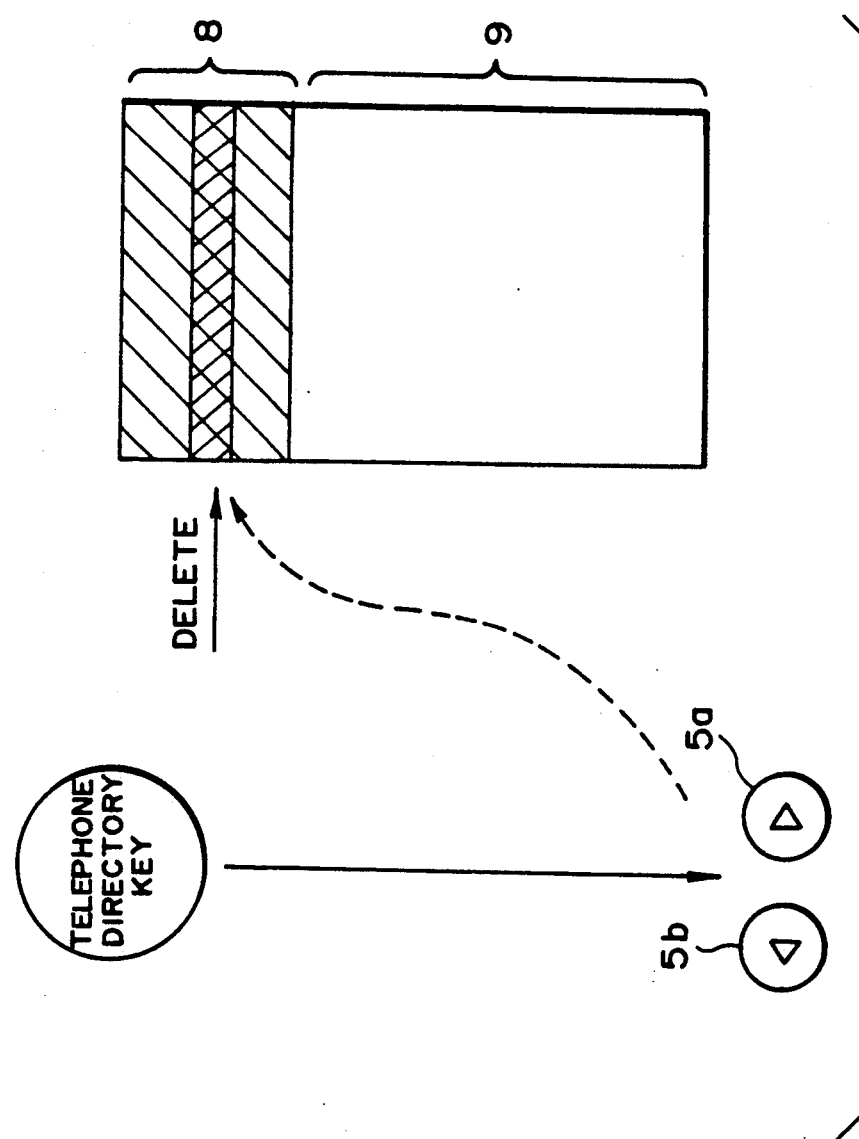

For the retrieval of the formal registration data, the telephone directory key 4 is depressed as shown in FIG. 7. Thus, the retrieval area is limited to the registration area 8 (hatched area) instead of the vacant area 9. Thereafter, the telephone numbers are sequentially read out starting from the top of the registration area 8 by using the retrieval keys 5a and 5b, and they are displayed on the display unit 14. When the desired telephone number is displayed, the start key is depressed so that the call is made by using that telephone number.

Figure 8:
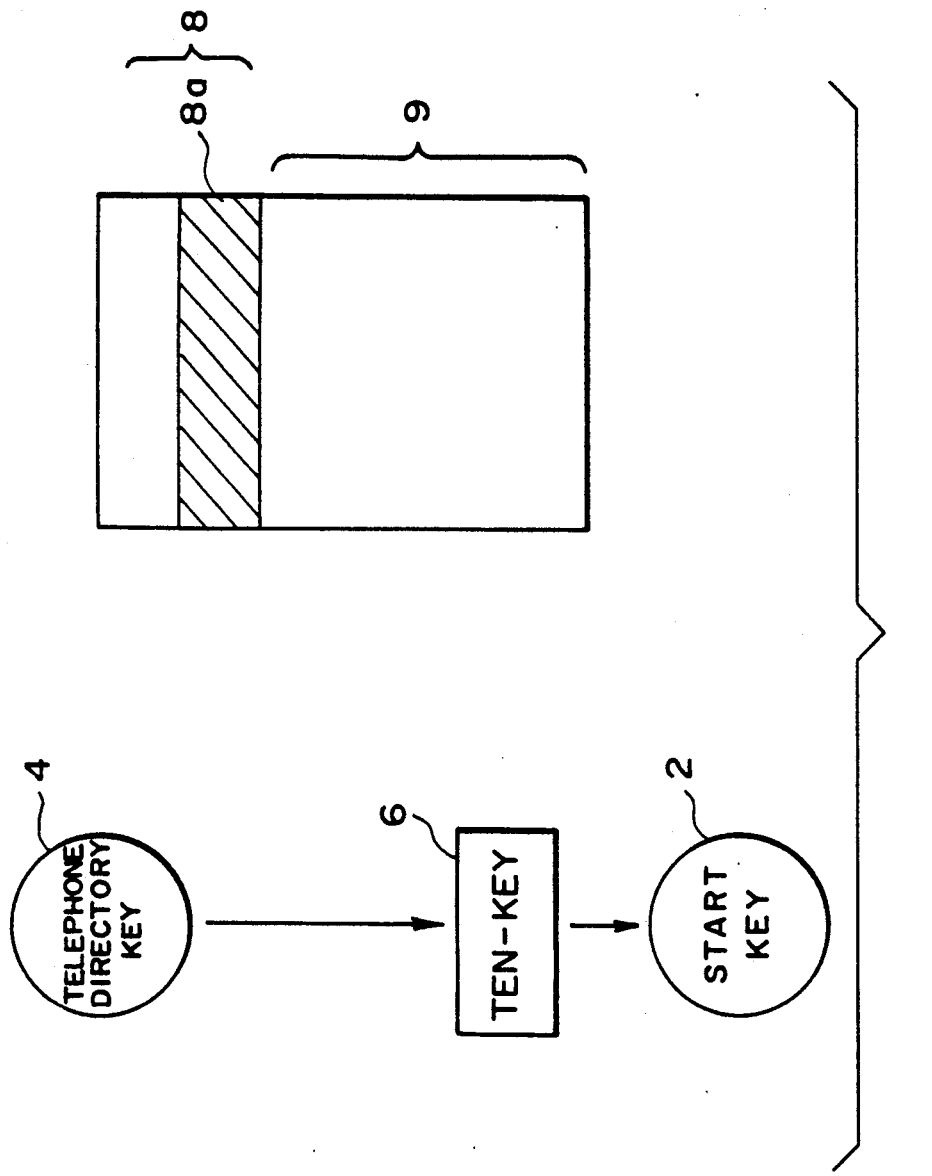

The registration of the formal data into the registration area 8 is done by a known process shown in FIG. 8. Namely, the telephone book key 4 is depressed first, and then the telephone number is entered by the ten-key 6. When the start key 2 is depressed, the data is registered at the rearmost portion of the registration area 8 as shown by numeral 8a.

Figure 9:
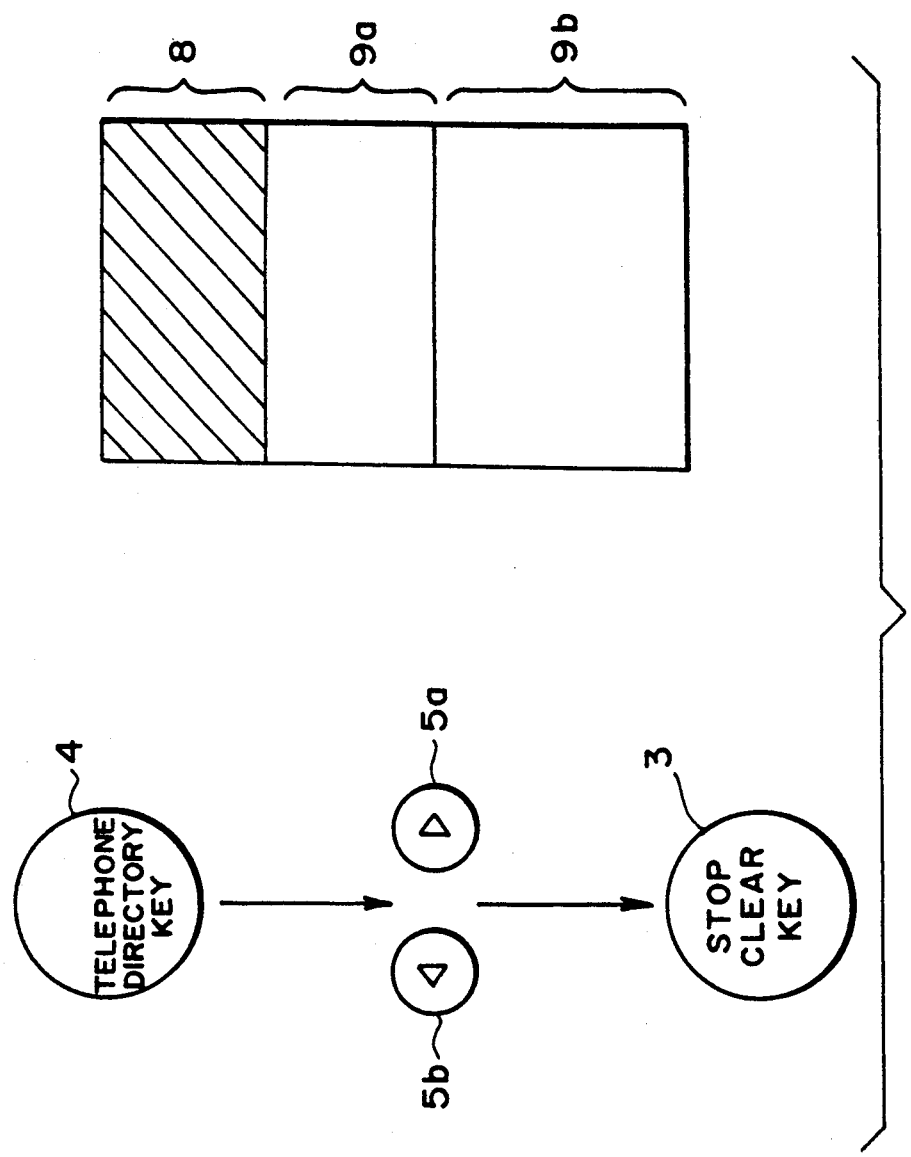

The deletion of the formal data stored in the registration area 8 is done by a known process shown in FIG. 9.

Namely, in FIG. 9, when the telephone directory key 4 is depressed, the registration area 8 shown by the hatched area is selected as a target for the processing as it is in the case of FIG. 7, and the desired telephone number is displayed on the display unit 14 by manipulating the retrieval keys 5a and 5b. When the telephone number to be deleted is displayed, the stop/clear key is depressed. Thus, the control unit 11 deletes the telephone number data which is displayed on the display unit 14, from the corresponding portion of the registration area 8, and releases that memory portion. The released memory portion is used as the vacant area 9.

In the above control process, the memory unit 13 is initially fully occupied by the vacant area 9, and as calls are made to various stations, the registration area 8 is automatically formed.

When the data in the registration area 8 is deleted, the vacant area 9 may not be formed in a continuous address space, unlike the case shown in FIGS. 6-9. By securing a predetermined size of area as a telephone number memory space and addressing the memory portion of each number by looking up a table, a troublesome process of memory purge is not necessary. Alternatively, a telephone number area may be of variable length record and the memory purge may be periodically made.

When manual dialing is done to a number of stations, it may not be possible to secure the vacant area to store the telephone numbers thereof. In this case, the telephone number data which has been least frequently used may be deleted, or the telephone number may be deleted in the sequence of data based on the stored serial numbers, times and the like of the telephone numbers manually entered.

Figure 6:
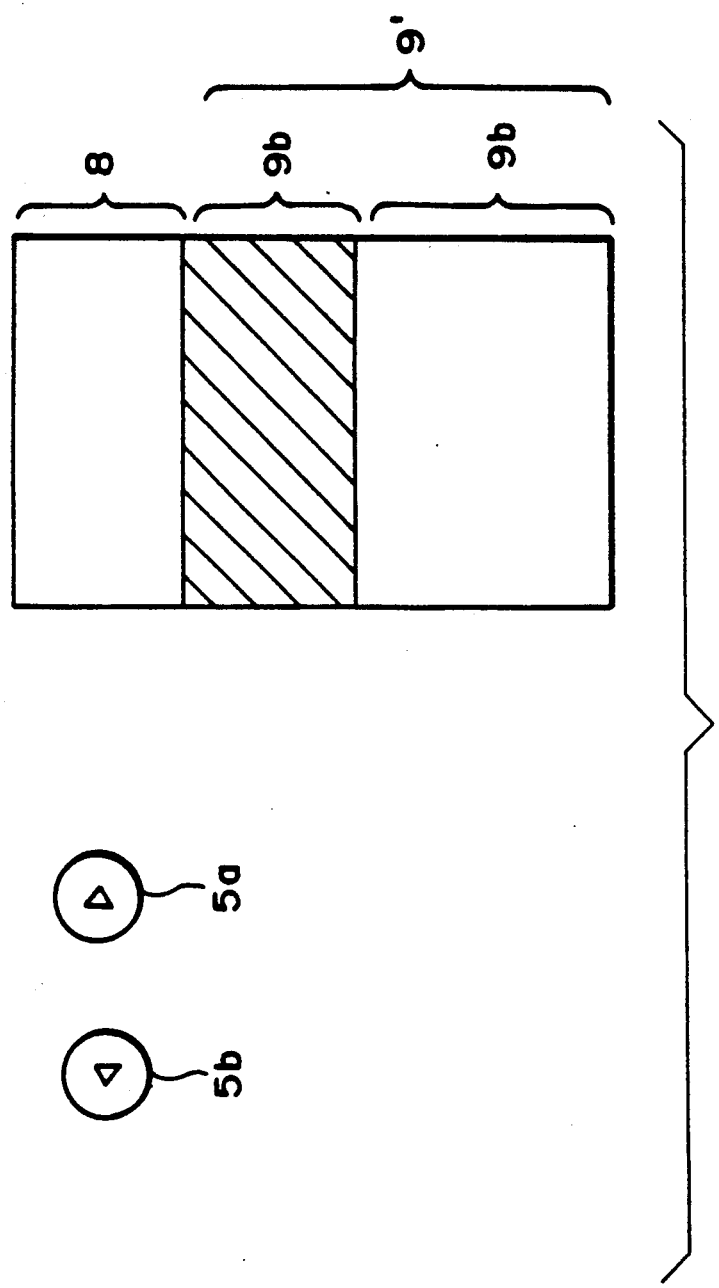

In the present embodiment, the deletion of the telephone number stored in the manual dialing mode is not done. As shown in FIG. 6, the telephone number may be deleted when the depression of the stop/clear key 3 is detected after the desired telephone number has been retrieved and displayed by manipulating the retrieval keys 5a and 5b.

The communication apparatus which uses the telephone number as a communication parameter has been shown and described above. The present invention is also applicable to an apparatus other than the communication apparatus, which processes a telephone number such as an electronic notebook. In such a case, a calling tone may be generated as a voice signal instead of the above call process, and the retrieved data may be outputted in any form.

The present invention is also applicable to an apparatus which registers and retrieves data other than telephone numbers.

I claim:

1. A system for registering data into a memory said system having memory means for storing a plurality of data in a predetermined form and retrieving the data stored in said storage means for use in a desired process, characterized in that:

said memory means is divided into a first area in which the data in said predetermined form is registered in accordance with a predetermined process, and a second area which is other than said first area;

the data in said predetermined form, used in said desired process as well as frequency of use data are stored in said second area; and the data in said predetermined form stored in said second area is reused for said desired process in accordance with a predetermined step, the frequency of use data of the data in said predetermined form is updated, and when the frequency of use data reaches a predetermined state, the data in said predetermined form is moved into the first area as formal registration data.

2. A system for registering data into a memory according to claim 1 wherein said frequency of use data represents the number of times of use.

3. A system for registering data into a memory according to claim 1 wherein the data to be stored in said memory means is data relating to a telephone number.

4. A system for registering data into a memory according to claim 1 further comprising calling means for making a call in accordance with the telephone number data stored in said memory means.

5. A data processing system comprising:

first memory means for registering data in a predetermined form in accordance with a predetermined procedure;

second memory means for storing frequency of use data together with the data in the predetermined form; and data processing means for reading out the data stored in said first memory means and said second memory means for desired processing;

said data processing means updating frequency of use data of the data when the data read from said second memory means is processed, and registers that data into said first memory means when the frequency of use data reaches a predetermined state.

6. A data processing system according to claim 5 wherein said first memory means and said second memory means are in one memory.

7. A data processing system according to claim 5 wherein said data in the predetermined form is data relating to a telephone number.

8. A data processing system according to claim 7 further comprising calling means for making a call in accordance with the telephone number stored in said first or second memory means.

9. A data processing system according to claim 5 wherein said frequency of use data represents the number of times of use.

10. A data processing system comprising:

first memory means for registering data relating to a telephone number:

second memory means for storing frequency of use data together with the data relating to a telephone number;

calling means for making a call in accordance with the telephone number stored in said first or second memory means; and control means of reading out data stored in said first memory means and said second memory means for calling;

said control means updating the frequency of use data when a call is made in accordance with the data read from said second memory means, and registering that data into said first memory means when the frequency of use data reaches a predetermined state.

11. A data processing system according to claim 11, wherein said first memory means and said second memory means are in one memory.

* * * * *

UNITED STATES PATENT AND TRADEMARK OFFICE
CERTIFICATE OF CORRECTION

PATENT NO. : 5,034,976

DATED : July 23, 1991

INVENTOR(S) : Kenichiro Sato

It is certified that error appears in the above-identified patent and that said Letters Patent is hereby corrected as shown below:

TITLE PAGE:

IN [30] FOREIGN APPLICATION PRIORITY DATA

"Mar. 2, 1989 [JP] 03021989 ............... 1-48638"
should read --Mar. 2, 1989 [JP] ............ 1-48638--.

COLUMN 3

Line 33, "has" should read --have--.

COLUMN 5

Line 19, "memory said" should read --memory, said--.

COLUMN 6

Line 47, "claim 11," should read --claim 10,--.

Signed and Sealed this

Thirteenth Day of April, 1993

*Attest:*

STEPHEN G. KUNIN

*Attesting Officer*     *Acting Commissioner of Patents and Trademarks*